US010003371B1

(12) United States Patent
Given et al.

(10) Patent No.: US 10,003,371 B1
(45) Date of Patent: Jun. 19, 2018

(54) ELECTRONIC DEVICE CASE COMPRISING SLIDING CAMERA LENS COVERS

(71) Applicants: Dennis Given, San Francisco, CA (US); Torian Holt, Durham, NC (US)

(72) Inventors: Dennis Given, San Francisco, CA (US); Torian Holt, Durham, NC (US)

(*) Notice: Subject to any disclaimer, the term of this patent is extended or adjusted under 35 U.S.C. 154(b) by 0 days. days.

(21) Appl. No.: 15/610,536

(22) Filed: May 31, 2017

(51) Int. Cl.
*H04B 1/38* (2015.01)
*H04B 1/3888* (2015.01)
*H04M 1/02* (2006.01)

(52) U.S. Cl.
CPC ........ *H04B 1/3888* (2013.01); *H04M 1/0264* (2013.01)

(58) Field of Classification Search
CPC ............................ H01B 1/3888; H04M 1/0264
See application file for complete search history.

(56) References Cited

U.S. PATENT DOCUMENTS

| 2009/0181729 | A1* | 7/2009 | Griffin, Jr. | ........... | H04N 5/2254 455/575.1 |
| 2014/0119718 | A1* | 5/2014 | Oh | ........ | G03B 11/041 396/448 |
| 2015/0311941 | A1* | 10/2015 | Sorrentino | ............ | H04M 1/185 455/575.8 |
| 2017/0208911 | A1* | 7/2017 | Goldfain | ................ | A45C 11/00 |

* cited by examiner

*Primary Examiner* — Tuan Pham
(74) *Attorney, Agent, or Firm* — NK Patent Law, PLLC

(57) ABSTRACT

The presently disclosed subject matter relates to a case for use with a personal electronic device comprising front and rear camera lenses. Particularly, the disclosed case comprises front and rear covers that selectively move to cover and uncover the camera lenses on demand. In addition, the covers prevent dust, dirt, and the like from contacting and damaging the device cameras. Optionally, the disclosed case includes an integral storage compartment for housing credit cards, ID cards, and the like. In some embodiments, the stored items can be used with a slot integral to the case to function as a support stand.

20 Claims, 9 Drawing Sheets

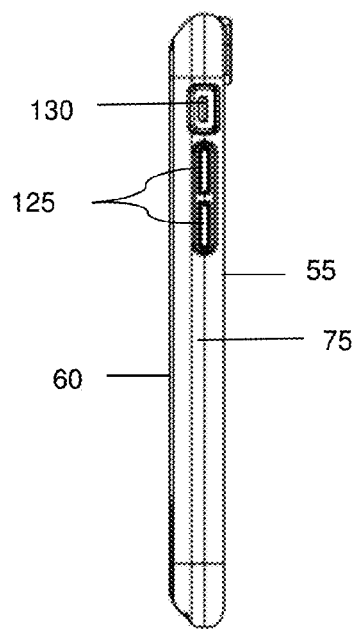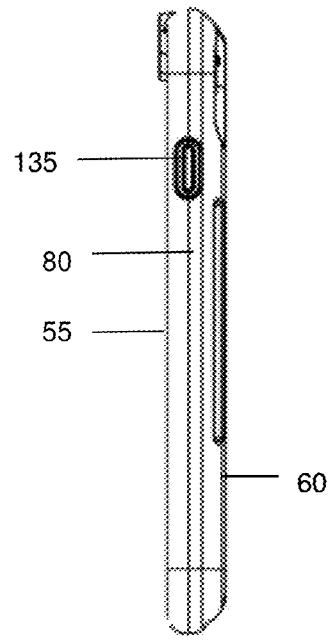
Fig. 2c    Fig. 2d
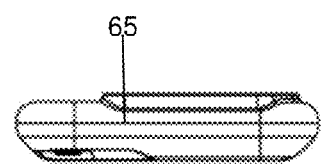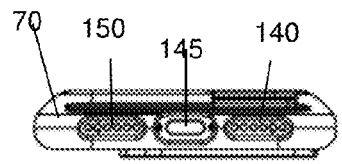
Fig. 2e    Fig. 2f

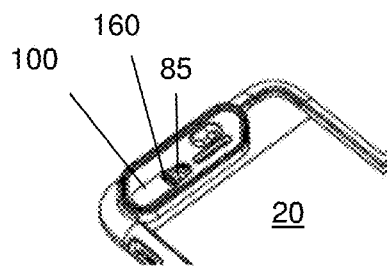
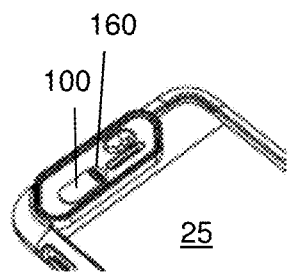
Fig. 3a    Fig. 3b
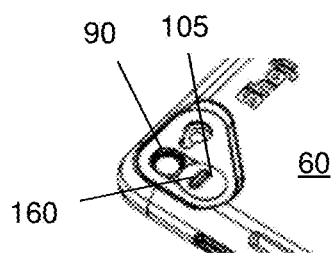
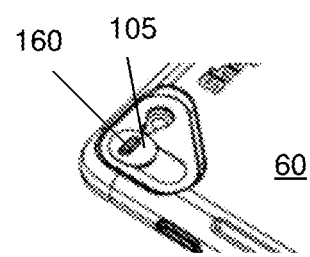
Fig. 3c    Fig. 3d

ELECTRONIC DEVICE CASE COMPRISING SLIDING CAMERA LENS COVERS

TECHNICAL FIELD

The presently disclosed subject matter relates generally to cases that comprise a plurality of camera lens covers for use with portable electronic devices, such as cell phones.

REARGROUND

With the rapid development of communication technology, personal electronic devices (e.g., cell phones, laptops, tablets) have become an integral part of an individual's everyday work and communication implements. Such personal electronic devices typically have dual cameras to enable better photo resolution and quality. Typical cases for electronic devices leave the camera exposed at all times. As a result, users have been known to accidentally record images or video using the dual camera at unintended times. In addition, unauthorized individuals (such as hackers) can gain access to a computing device without the owner's knowledge using the internet, Wi-Fi, and the like to eavesdrop or spy on the owner. It would therefore be beneficial to prevent unintended or unauthorized access to a camera on a personal electronic device.

SUMMARY

In some embodiments, the presently disclosed subject matter is directed to a case for attachment to a portable electronic device comprising a front camera and a rear camera. The case comprises a body comprising a front face and a rear face; a front opening positioned on the front face of the body, configured to align with the device front camera; a rear opening positioned on the rear face of the body, configured to align with the device rear camera; a front cover, sized and shaped to fit within the front opening and movable between a first position and a second position, wherein the front cover blocks the front camera in the first position and does not interfere with the front camera in the second position; and a rear cover, sized and shaped to fit within the rear opening and movable between a first position and a second position, wherein the rear cover blocks the rear camera in the first position and does not interfere with the rear camera in the second position.

In some embodiments, the device is selected from a cellular telephone, smart phone, tablet computer, or laptop. In some embodiments, the case is substantially form-fitting to the device. In some embodiments, the front and rear covers are removably attached to the case. In some embodiments, the front cover moves in a right-to-left direction when moving from first to second positions, when the case is oriented for use in the user's hand. In some embodiments, the rear cover moves in an up-to-down direction when moving from first to second positions, when the case is orientated for use in the user's hand. In some embodiments, the front and rear covers comprise or more gripping elements selected from textured portions, indentations, raised portions, or combinations thereof. In some embodiments, the front and rear covers move independently of each other. In some embodiments, the front and rear covers move through the use of grooves that cooperate with grooves on the edges of the front and rear openings.

In some embodiments, the case comprises a compartment integral with the rear face of the body, wherein the compartment comprises an opening and is adapted to hold at least one item, and a cut-out to provide access to the compartment for receiving the one or more items. In some embodiments, the compartment is dimensioned for receiving and housing at least one card having the general dimensions of a credit card. In some embodiments, the compartment is formed between a surface of the device and the rear surface of the case. In some embodiments, the cut-out is formed adjacent to a bottom edge of the case. In some embodiments, the cut-out is formed in the lower right hand corner of the rear face of the cover and connects with the compartment. In some embodiments, the item is selected from a credit card, debit card, business card, ID card, driver's license, mirror, or combinations thereof.

In some embodiments, the case comprises a slot configured for partial insertion of at least one item in a direction substantially perpendicular to the rear wall of the device. In some embodiments, the at least one item is selected from a credit card, debit card, driver's license, ID card, business card, mirror, or combinations thereof. In some embodiments, the item supports the device in either the landscape orientation or the portrait orientation.

In some embodiments, the case comprises first and second rigid panels containing a slot sized and shaped to retain the first and second covers, wherein the panels are positioned between the device and the cover, and wherein the covers include a portion that engages a rear face of the panel and a portion that engages a front face of panel, whereby the cover is maintained within the slot but can move laterally.

BRIEF DESCRIPTION OF THE DRAWINGS

The previous summary and the following detailed descriptions are to be read in view of the drawings, which illustrate some (but not all) embodiments of the presently disclosed subject matter. It should be appreciated that the drawings herein are not necessarily drawn to scale.

FIG. 2a is a front elevation view of a case in accordance with some embodiments of the presently disclosed subject matter.

FIG. 2b is a rear elevation view of the case of FIG. 2a.

FIG. 2c is a right side elevation view of the case of FIG. 2a.

FIG. 2d is a left side elevation view of the case of FIG. 2a.

FIG. 2e is a top plan view of the case of FIG. 2a.

FIG. 2f is a bottom plan view of the case of FIG. 2a.

FIGS. 3a and 3b are fragmentary views of a case in use in accordance with some embodiments of the presently disclosed subject matter.

FIGS. 3c and 3d are fragmentary views of a case in use in accordance with some embodiments of the presently disclosed subject matter.

DETAILED DESCRIPTION

The presently disclosed subject matter is introduced with sufficient details to provide an understanding of one or more particular embodiments of broader inventive subject matters. The descriptions expound upon and exemplify features of those embodiments without limiting the inventive subject matters to the explicitly described embodiments and features. Considerations in view of these descriptions will likely give rise to additional and similar embodiments and features without departing from the scope of the presently disclosed subject matter.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example, reference to "a device" can include a plurality of such devices, and so forth.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments +/−10%, in some embodiments +/−5%, in some embodiments +/−1%, in some embodiments +/−0.5%, and in some embodiments +/−0.1%, from the specified amount, as such variations are appropriate in the presently disclosed subject matter.

The presently disclosed subject matter relates to personal electronic devices that have front and rear cameras. The term "electronic device" or "device" as used herein can comprise any of the wide variety of computing devices that include cameras, such as (but not limited to) cellular telephones, smart phones, tablet computers, laptops, or any other device that has a camera lens.

Figure 1A:
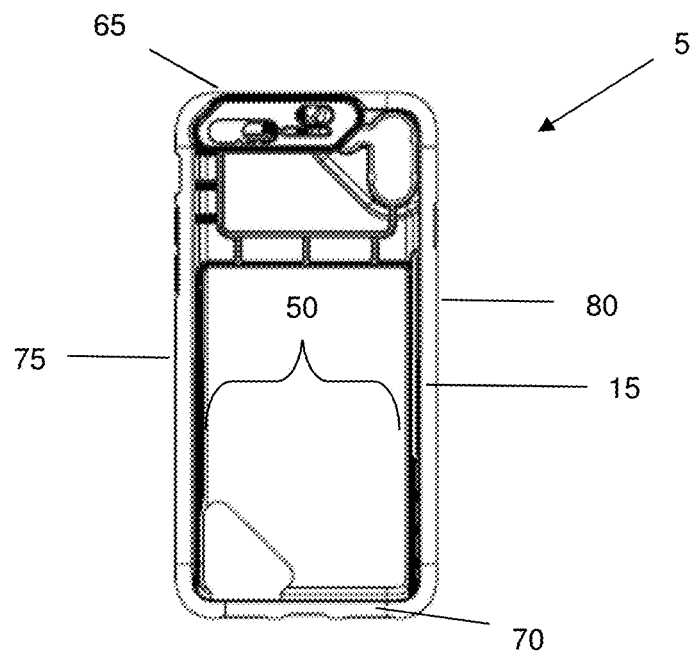
FIG. 1a is a top plan view of an electronic device case in accordance with some embodiments of the presently disclosed subject matter.
Figure 1B:
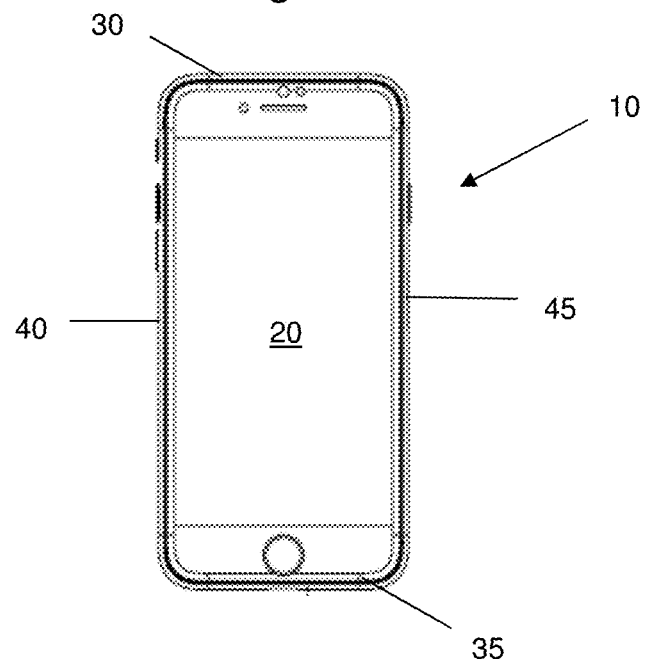
FIG. 1b is a top plan view of a device in accordance with some embodiments of the presently disclosed subject matter.

FIGS. 1*a* and 1*b* illustrate one embodiment of case 5 that can be used with electronic device 10. Case 5 includes body 15 that can be removably disposed on device 10, covering at least a portion of device front face 20, rear face 25, top 30, bottom 35, and left and right side edges 40, 45. FIG. 1*a* illustrates that case 5 comprises compartment 50 that is appointed for removably receiving and housing device 10. In some embodiments, case 5 can have a generally rectangular shape with front side 55, rear side 60, top end 65, bottom end 70, and left and right edges 75, 80. However, the shape of case 5 is not limited and can be configured in any desired shape. In some embodiments, the shape of case 5 can mimic the shape of device 10. Thus, in some embodiments, the overall size and shape of case 5 is substantially similar or identical to that of device 10.

Figures 2A, 2B:
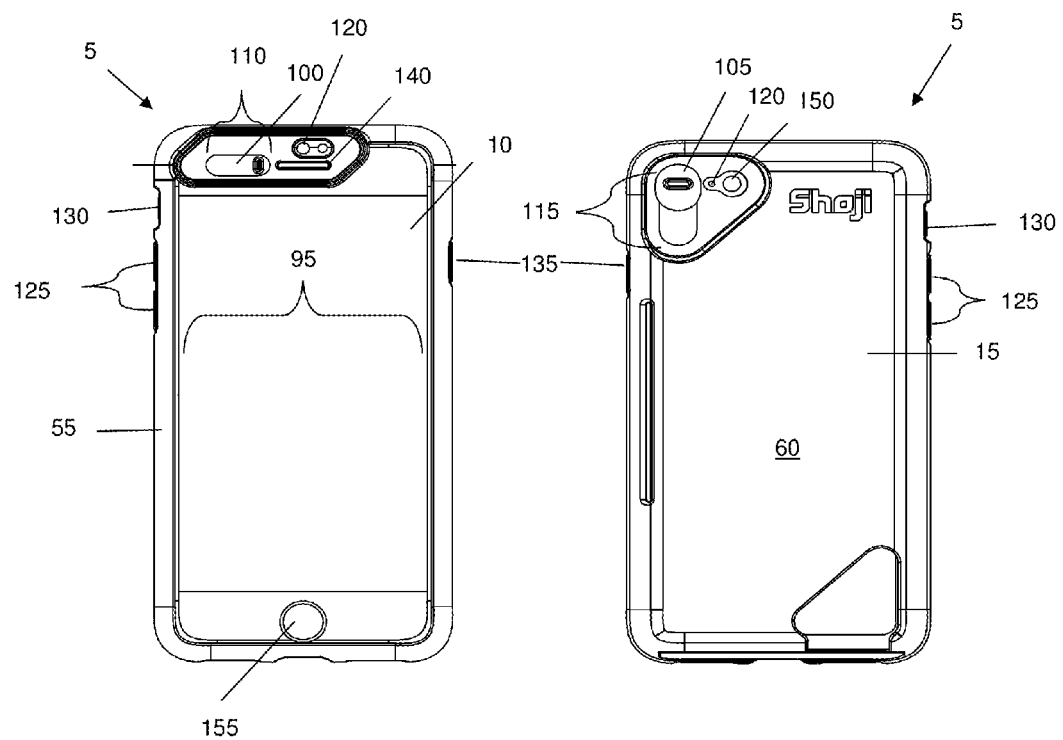

As used herein, the term "front" when used with a device or cover refers to the face comprising the screen that the user interacts with (i.e., the viewing screen). The term "rear" refers to the face opposite the front face. The term "top" as used with the disclosed device or case refers to the face that is furthest from the ground in embodiments when the user is facing the front of the device or case (i.e., held in the user's hand in suitable orientation for use). Similarly, the term "bottom" refers to the device or case face that is closest to the ground in embodiments in use, opposite the top face. The terms "right" and "left" as used herein refer to the right or left side as viewed by the user looking at the right or left side of the device or case when in use, with the front face oriented toward the user. In some embodiments, the "use orientation" of device 10 refers to the orientation wherein the home button is adjacent to bottom edge 70, as depicted in FIG. 2*a*.

Body 15 can be constructed from one piece or from multiple pieces that are attached or adhered together. For example, in some embodiments, body 15 can comprise front and rear pieces that snap or are otherwise affixed together (i.e., through the use of adhesives, mechanical closures, and the like). In some embodiments, the body can be constructed from a single piece of flexible material (such as rubber) that stretches to protect key parts of device 10.

Figure 1C:
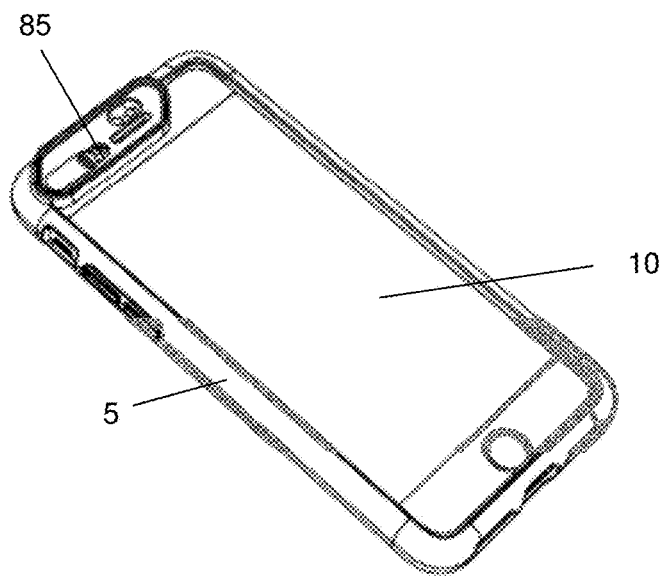
FIG. 1c is a perspective view of the front of an electronic device case in accordance with some embodiments of the presently disclosed subject matter.
Figure 1D:
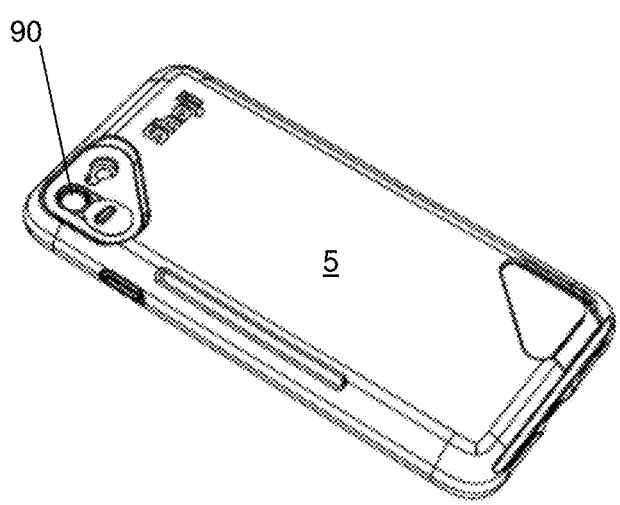
FIG. 1d is perspective view of the back of the electronic device case of FIG. 1c.

As shown in FIGS. 1*c* and 1*d*, it is envisioned that case 5 be placed onto and/or around device 10 to allow full use of the device with minimal or no interference from the case when attached. Advantageously, case 5 can protect device 10 from impact damage and/or contact damage. In addition, the disclosed case provides added security for the device cameras to prevent unintentional and/or malicious access or recording of video and images. Although depicted as a cell phone in the disclosed figures, it should be appreciated that device 10 is not limited and the disclosed cover can be customized for use with a variety of portable electronic devices.

One embodiment of case 5 is shown in FIGS. 2*a*-2*f*, representing front, rear, right, left, top, and bottom views, respectively. As shown, device 10 can include a dual lens camera, with first camera lens 85 that faces the user and second camera lens 90 that faces away from the user when the device is in use. Case 5 comprises main opening 95 on front face 55 that allows a user to access the viewing screen of device 10. That is, in some embodiments, cover 5 substantially does not cover a screen (e.g., a touchscreen) of device 10. In some embodiments, the front face includes a transparent screen cover that fits over the screen of a device (e.g., a cell phone viewing screen).

Case 5 can be sized and shaped such that access to various features of device 10 are still accessible by the user. Particularly, body 15 can comprise additional openings to allow the user to freely access various operating controls on device 10. For example, as shown in FIGS. 2*a*-2*f*, body 15 can include additional openings to allow access to front and rear flash 120, volume controls 125, ring/silent switch 130, on/off switch 135, speaker(s) 140, charging aperture 145, microphone 150, home button/touch ID sensor 155, various sensors, and so forth.

Front and rear movable lens covers 100, 105 are slidably coupled to body 15, allowing the user to block cameras 85, 90 on demand. Each movable lens cover can have two positions relative to device 10. Particularly, as shown in FIG. 3a, in the "open" position, front camera 85 is exposed by positioning front camera cover 100 out of the viewing scope of the camera. Further, as shown in FIG. 3b, in the "closed" position, front camera 85 is blocked by front camera cover 100, covering the camera but still allowing the other normal functions of device 10 to continue. FIGS. 3c and 3d illustrate the same mechanism used with rear camera cover 105 relative to rear camera lens 90 (i.e., the rear camera cover slides from an open position where the rear camera is exposed to a closed position where the cover is disposed over the rear lens).

Covers 100, 105 are installed within front and rear cover openings 110, 115, respectively, of body 15. Any sliding mechanism known or used in the art can be used to ensure that the covers slide to and from the open and closed positions on demand. For example, in some embodiments, the outer edges of covers 100, 105 mate with corresponding tracks positioned on the outer edges of openings 110, 115. It should be appreciated that alternate mechanisms can be used to effect the sliding mechanism, such as male/female mating arrangements, aligned grooves, snap-fit arrangements, mechanical closures, and the like. The covers are configured to slide into and along the side edge portions of the openings. In some embodiments, openings 110, 115 provide a recessed track over which the front and rear covers can slide.

Figure 4:
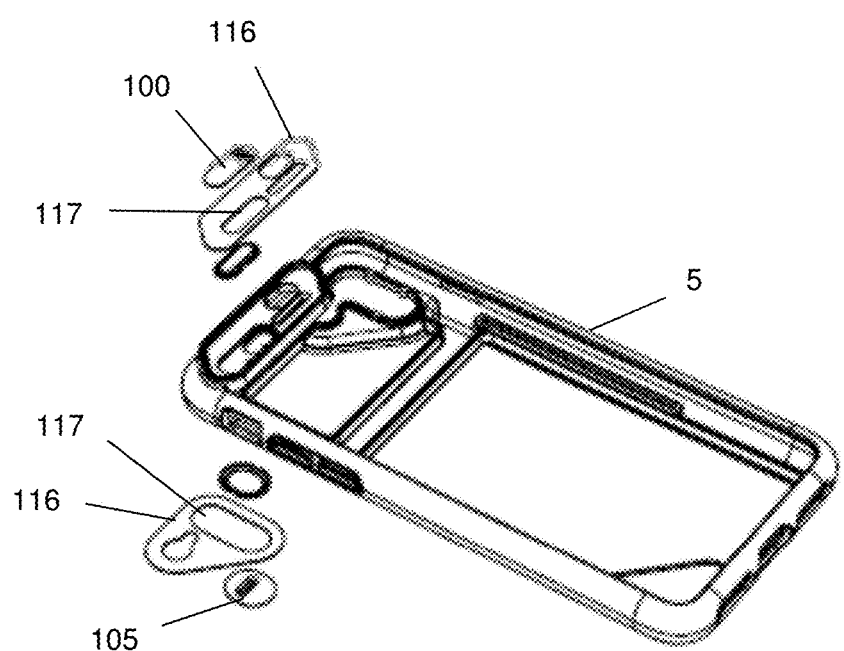
FIG. 4 is an exploded perspective view of one embodiment of a case and its corresponding parts.

As shown in FIG. 4, in some embodiments, each section of the area that houses covers 100, 105 comprises a separate panel that can be adhered to case body 15 and positioned between the case body and the device. The thin panels function to trap covers 100, 105 on each side of slots 117 but still allow the covers to move within each slot. Panels 116 can be constructed from any rigid or semi-rigid material known or used in the art, including (but not limited to) metal, plastic, and combinations thereof. The term "rigid" as used herein refers to a material that has a high stiffness or modulus of elasticity (e.g., a modulus of elasticity of about $0.5 \times 10^6$ psi or greater). Thus, a rigid material holds a shape without external support, and has a high resistance to deformation by external forces. The term "semi-rigid" refers to materials that hold a shape without external support, but exhibit higher flexibility when external forces are exerted. Panels 116 can be permanently or releasably adhered to the body 15 of the case using known methods (adhesive, mechanical closures, snap-fit arrangement, and the like). Thus, covers 100, 105 are slidably retained within slots 117 of the rigid panels. Particularly, in some embodiments, each cover comprises a portion that is maintained within slot 117 of the panel, and a portion that engages the front and/or rear area comprising a camera on the electronic device. Thus, the cover is therefore slidably retained within the slot of the panel, thereby making it a permanent part of the assembly. The panels are positioned such that slots 117 are fitted over and overlay openings 110, 115. Thus, in some embodiments, each slot 117 is of about the same size and shape as opening 110 or 115. In some embodiments, the cover comprises a portion that engages the front face of the rigid panel and a portion that engages the rear face of the rigid panel, thereby capturing the cover but still allowing it to move laterally (i.e., in some embodiments, the portions can include ridges, areas of greater with than the slots, etc.).

As set forth above, covers 100, 105 function to selectively expose and block the front and rear camera lenses of device 10. Thus, the covers (and cover openings) are configured to overlap the device camera lenses. In some embodiments, front cover 100 is positioned on front face 55 of body 15, in the upper top left side portion and slides in a left-to-right or right-to-left direction. In some embodiments, rear cover 105 is positioned on rear face 60 of body 15 in the upper left hand corner of the cover and slides in the up-to-down and down-to-up direction. However, if should be appreciated that the disclosed cover is not limited, and the first and second camera covers can be positioned at any location on body 15, so long as they can be moved to overlap (cover) the device cameras on demand. It should further be appreciated that the disclosed device includes embodiments wherein more than 2 camera covers are present, i.e., when a device has 3 or more cameras, for example.

In some embodiments, covers 100, 105 comprise one or more gripping elements 160 that allow a user to easily maneuver the cover to a desired open or closed position. In some embodiments, the gripping elements can be configured as raised portions to allow the user to easily manipulate the covers. However, gripping elements 160 are not limited, and can include any design known or used in the art, such as textured portions, indentations, and/or raised portions that facilitate covers 100, 105 being manually slid by a user.

It should be understood that covers 100, 105 are not limited to the shapes depicted in the Figures, so long as they perform the intended function of covering the device camera lenses when in the closed position, and exposing the camera lenses in the open position. However, covers 100, 105 should be sized and shaped to prevent obstruction of the field of view when the camera is in use. Thus, although depicted as rounded rectangles in the Figures, covers 100, 105 can be configured in any desired shape (i.e., square, oblong, oval, circular, abstract, and the like).

In use, a force or pressure can manually be applied to covers 100, 105 (e.g., using a finger) causing the covers to slide between open and closed positions within cover openings 110, 115. In this manner, covers 100, 105 can be selectively positioned within the cover openings to either block cameras 85, 90 or leave the cameras exposed and thus otherwise operational. Thus, in use, the user can manually slide cover 100 and/or 105 from the "open" position (whereby the camera lens is exposed) to the "closed" position (where the camera lens is covered) at any desired time, such as when the device or camera is not in use. Similarly, the user can manually slide cover 100 and/or 105 from the "closed" position to the "open" position at any desired time, such as when the user desires to use the camera. It should be appreciated that covers 100, 105 move independently of each other. Thus, in some embodiments, front cover 100 can be open and rear cover 105 can be closed and vice versa. Further, in some embodiments, both front and rear covers 100, 105 can be closed or open.

Thus, in use the user slides the covers manually to uncover or cover the front and rear camera lenses, thereby allowing or preventing camera access. In some embodiments, gravity keeps covers 100, 105 in a desired position. However, in some embodiments, various other closure mechanisms known or used in the art can be used, such as friction fit closures, snap fit closures, recessed groove fit, hook and loop closures, and the like. For example, in some embodiments, friction between the covers and the inner edges of cover openings 110, 115 can prevent the covers from undesirably moving within the openings unless an external force is manually applied. In addition, the closing mechanisms prevent the covers from falling out of position or being removed from the cover openings. In some embodiments, the case comprises one or more male detents in the flexible material of the case that have a corresponding female cut-out in one or more positions on the sliding camera cover(s) such that the cover retains its position, but it allowed to be moved by the flexure of the male detent within the case.

Thus, covers 100, 105 allow the user to block unwanted surveillance via the device camera lens from hackers and third parties by blocking the device camera on demand. In addition, the covers fit over the camera when in the "closed" position, thereby protecting the camera and the camera lens from damage, dust, and the like when not in use. Accordingly, the disclosed cover protects the user's privacy and also prevents camera damage.

Figure 5A:
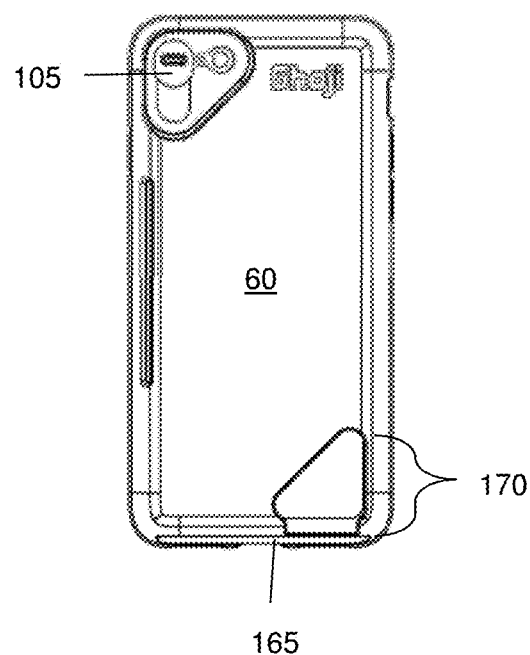
FIG. 5a is a rear elevation view of a case in accordance with some embodiments of the presently disclosed subject matter.
Figure 5B:
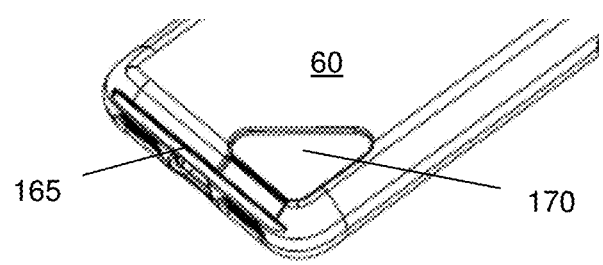
FIG. 5*b* is an enlarged fragmentary view of the case of FIG. 5*a*.

In some embodiments, case 5 comprises compartment 165 sized and shaped to house one or more items (i.e., 1, 2, 3, 4, etc.). For example, as shown in FIGS. 5a and 5b, compartment 165 can be configured as a thin, flat, rectangular-shaped compartment positioned on rear face 60 of the case, at the top or bottom edge. In some embodiments, the compartment is formed between the face of device 10 and the rear face of the case. Alternatively, in some embodiments, compartment 165 can be formed as a pocket constructed from plastic, rubber, fabric, and the like. In some embodiments, the rear face of the cover further includes cut-away notch 170 positioned adjacent to and connected with compartment 165 to allow a user to easily access the items stored within the compartment. In some embodiments, notch 170 can be positioned adjacent to a bottom edge of the case and connects with the compartment (e.g., the opening).

Figure 5C:
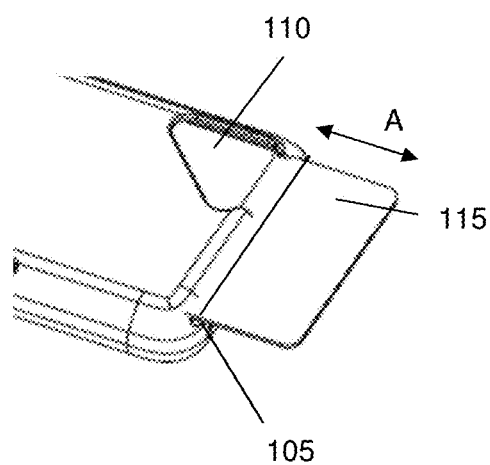
FIG. 5*c* is an enlarged fragmentary view of the case of FIG. 5*a* in use.

Although depicted as triangular in the figures, cut-out notch 170 can be configured in any desired shape (i.e., square, rectangular, diamond, circular, abstract, and the like). In use, a user would simply apply slight pressure to the item (e.g., credit card) visible within notch 170 in compartment 165 and apply a sliding motion to retrieve the card for use or for proper positioning. Thus, a user would simply insert or remove one or more items 175 into/out of compartment 165 using a sliding motion, as shown by arrow A in FIG. 5c. In this way, case 5 allows a user to secure a plurality of items (i.e., driver's license, debit card, credit card, key card, ID card, business card, employee badge, paper money, etc.) safely and securely. In some embodiments, the item can be sized to have a width of no more than about 2.5 inches and a length of no more than 4 inches. Thus, in some embodiments, cover 5 includes an integrated storage compartment that eliminates the necessity to carry credit cards, driver's license, and case 5 as separate units.

Figure 6A:
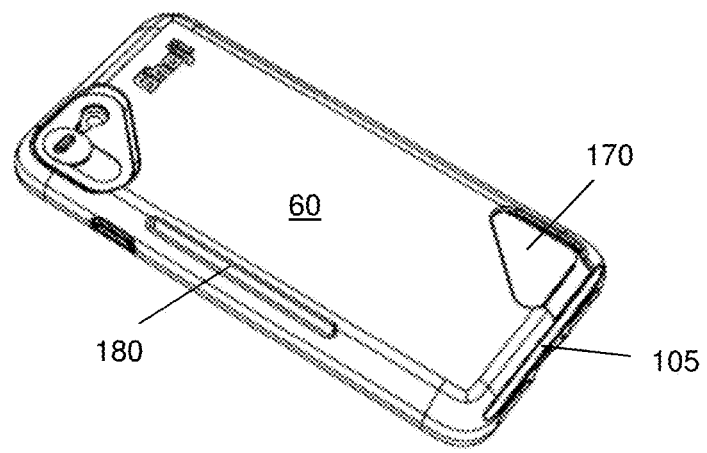
FIG. 6*a* is a perspective view of a case in accordance with some embodiments of the presently disclosed subject matter.
Figure 6B:
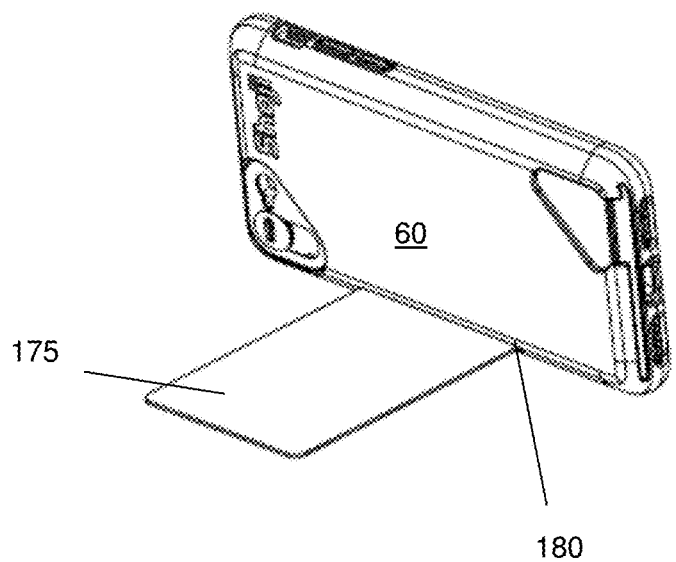
FIG. 6*b* is a perspective view of the case of FIG. 6*a* in use.

Optionally, rear face 60 of the case can include slot 180 sized and shaped to allow a user to partially insert one edge of at least one item 175 to use as a phone stand, as shown in FIGS. 6a and 6b. Particularly, the case allows the user to place an item (i.e., a credit card) partially into slot 180 (i.e., at least about 5, 10, 15, 20, 25, 30, 35, 40, 45, 50, 55, 60, 65, 70, 75, 80, or 85 percent of the item is inserted into the slot) which holds the item so that it becomes a horizontal or vertical stand (i.e., the device can be supported in the landscape or portrait orientations). In some embodiments, when the item is positioned within the slot, it is in a direction substantially perpendicular to the rear wall of device 10. In some embodiments, slot 180 can be positioned adjacent to (and/or parallel with) left or right faces 75, 80 of the case. After the user is finished using item 175 as a stand, he can simply remove it from slot 180, and places it into rear compartment 165 for storage. It should be appreciated that when used as a stand, item 175 should be constructed from rigid or semi-rigid material (i.e., metal, plastic, cardboard, glass, and the like) to support the weight of the device and case, such as a credit card.

Cover 5 can be constructed from a variety of materials known and used in the art, including (but not limited to) rubber, plastic, metal, metal alloy, and combinations thereof. In some embodiments, cover 5 can be constructed from a flexible material (such as rubber) that stretches around device 5 and fits tightly around it to protect key parts of the device. In some embodiments, the cover can be constructed from more than one piece. For example, in some embodiments cover 5 can have at least front and rear pieces that are joined together (i.e., through snap-fit, adhesive, or other similar joining mechanisms).

Cover 5 can be constructed using any method known or used in the art. For example, in some embodiments, the cover can be constructed using an injection molding process, as would be known in the art.

It should be appreciated that cover 5 is not limited to the embodiments set forth herein. Rather, the cover can be constructed in a variety of shapes and sizes and can be modified to work with any personal electronic device by altering the size, shape, and/or location of the parts.

What is claimed is:

1. A case for attachment to a portable electronic device comprising a front camera and a rear camera, the case comprising:
   a body comprising a front face and a rear face;
   a front opening positioned on the front face of the body, configured to align with the device front camera;
   a front panel, sized and shaped to fit within the front opening, wherein the front panel comprises a slot;
   a rear opening positioned on the rear face of the body, configured to align with the device rear camera;
   a rear panel, sized and shaped to fit within the rear opening, wherein the rear panel comprises a slot;
   a front cover, sized and shaped to be slidably retained within the slot of the front panel and movable between a first position and a second position, wherein the front cover blocks the front camera in the first position and does not block the front camera in the second position; and
   a rear cover, sized and shaped to be slidably retained within the slot of the rear panel and movable between a first position and a second position, wherein the rear cover blocks the rear camera in the first position and does not block the rear camera in the second position.

2. The case of claim 1, wherein the device is selected from a cellular telephone, smart phone, tablet computer, or laptop.

3. The case of claim 1, wherein the case is substantially form-fitting to the device.

4. The case of claim 1, wherein the front and rear covers are removably attached to the case.

5. The case of claim 1, wherein the front cover moves in a right-to-left direction when moving from first to second positions, when the case is oriented for use in the user's hand.

6. The case of claim 1, wherein the rear cover moves in an up-to-down direction when moving from first to second positions, when the case is orientated for use in the user's hand.

7. The case of claim 1, wherein the body is formed from a plastic material.

8. The case of claim 1, wherein the front and rear covers comprise or more gripping elements selected from textured portions, indentations, raised portions, or combinations thereof.

9. The case of claim 1, wherein the front and rear covers move independently of each other.

10. The case of claim 1, wherein the front and rear covers move through the use of grooves that cooperate with grooves on the edges of the front and rear openings.

11. The case of claim 1, further comprising a compartment integral with the rear face of the body, wherein the compartment comprises an opening and is adapted to hold at least one item, and a cut-out to provide access to the compartment for receiving the one or more items.

12. The case of claim 11, wherein the compartment is dimensioned for receiving and housing at least one card having the general dimensions of a credit card.

13. The case of claim 11, wherein the compartment is formed between a surface of the device and the rear surface of the case.

14. The case of claim 11, wherein the cut-out is formed adjacent to a bottom edge of the case.

15. The case of claim 11, wherein the cut-out is formed in the lower right hand corner of the rear face of the cover and connects with the compartment.

16. The case of claim 11, wherein the item is selected from a credit card, debit card, business card, ID card, driver's license, mirror, or combinations thereof.

17. The case of claim 1, further comprising a slot configured for partial insertion of at least one item in a direction substantially perpendicular to the rear wall of the device.

18. The case of claim 17, wherein the at least one item is selected from a credit card, debit card, driver's license, ID card, business card, mirror, or combinations thereof.

19. The case of claim 17, wherein the item supports the device in either the landscape orientation or the portrait orientation.

20. The case of claim 1, further comprising first and second rigid panels containing a slot sized and shaped to retain the first and second covers, wherein the panels are positioned between the device and the case, and wherein the covers include a portion that engages a rear face of the panel and a portion that engages a front face of panel, whereby the cover is maintained within the slot but can move laterally.

* * * * *